(12) United States Patent
Kogan et al.

(10) Patent No.: US 10,657,036 B2
(45) Date of Patent: May 19, 2020

(54) DETERMINING VISUAL TESTING COVERAGES

(71) Applicant: ENTIT SOFTWARE LLC, Sanford, NC (US)

(72) Inventors: Olga Kogan, Yehud (IL); Ilan Shufer, Yehud (IL); Amit Levin, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 16/068,782

(22) PCT Filed: Jan. 12, 2016

(86) PCT No.: PCT/US2016/012934
§ 371 (c)(1),
(2) Date: Jul. 9, 2018

(87) PCT Pub. No.: WO2017/123203
PCT Pub. Date: Jul. 20, 2017

(65) Prior Publication Data
US 2019/0050323 A1    Feb. 14, 2019

(51) Int. Cl.
*G06F 11/36* (2006.01)
*G06F 3/01* (2006.01)
(Continued)

(52) U.S. Cl.
CPC .......... *G06F 11/3688* (2013.01); *G06F 3/013* (2013.01); *G06F 3/0487* (2013.01);
(Continued)

(58) Field of Classification Search
CPC ................................................. G06F 11/3688
(Continued)

(56) References Cited

U.S. PATENT DOCUMENTS 6,701,514 B1 * 3/2004 Haswell ............. G06F 11/3664
707/999.102
7,519,864 B2    4/2009 Alam et al.
(Continued)

FOREIGN PATENT DOCUMENTS

CN        103500011 A    1/2014
WO    WO-2005096453 A2    10/2005

OTHER PUBLICATIONS

First Office Action dated Aug. 1, 2019 for U.S. Appl. No. 15/778,073, filed May 22, 2018, 18 pp.
(Continued)

*Primary Examiner* — Hang Pan
*Assistant Examiner* — Bradford F Wheaton

(57) ABSTRACT

Example implementations relate to determining visual testing coverages. Some implementations may include a principal application screen identification engine to identify, based on an image processing analysis of a set of screenshots of an application under test, principal application screens that represent a set of test executions of the application under test. Some implementations may also include a user interface element identification engine to identify user interface elements in the principal application screens. Some implementations may also include a visual testing coverage engine to automatically identify, based on an analysis of gaze data and the user interface elements, a visual testing coverage of the application under test.

14 Claims, 10 Drawing Sheets

(51) Int. Cl.
*G06F 3/0487* (2013.01)
*G06T 7/20* (2017.01)

(52) U.S. Cl.
CPC ...... *G06F 11/3664* (2013.01); *G06F 11/3676* (2013.01); *G06T 7/20* (2013.01)

(58) Field of Classification Search
USPC .......................................................... 717/124
See application file for complete search history.

(56) References Cited

U.S. PATENT DOCUMENTS

| | | | |
|---|---|---|---|
| 8,549,483 | B1 | 10/2013 | Bridges, Sr. |
| 9,286,665 | B2* | 3/2016 | Kokemohr .............. G06T 5/009 |
| 2002/0108112 | A1 | 8/2002 | Wallace et al. |
| 2007/0025614 | A1 | 2/2007 | Qian |
| 2010/0295774 | A1 | 11/2010 | Hennessey |
| 2011/0131551 | A1 | 6/2011 | Amichai |
| 2011/0231823 | A1 | 9/2011 | Fryc |
| 2012/0204153 | A1* | 8/2012 | Peterson ............. G06F 11/3672 717/124 |
| 2012/0275521 | A1 | 11/2012 | Cui |
| 2013/0014085 | A1 | 1/2013 | Brennan |
| 2013/0063452 | A1 | 3/2013 | Ali et al. |
| 2013/0132839 | A1 | 5/2013 | Berry |
| 2013/0226845 | A1* | 8/2013 | Gobert ..................... G09B 7/04 706/12 |
| 2014/0067870 | A1* | 3/2014 | Chandrasekhar ..... H04L 65/403 707/797 |
| 2014/0075371 | A1 | 3/2014 | Carmi |
| 2014/0133766 | A1 | 5/2014 | Das |
| 2014/0165040 | A1* | 6/2014 | Augustin ............ G06F 11/3684 717/124 |
| 2014/0189576 | A1* | 7/2014 | Carmi .................. G06F 3/0481 715/781 |
| 2014/0380230 | A1* | 12/2014 | Venable ................. G06F 3/013 715/781 |
| 2015/0002675 | A1 | 1/2015 | Kundu et al. |
| 2015/0052503 | A1* | 2/2015 | Ligman ............... G06F 11/3664 717/125 |
| 2015/0169963 | A1 | 6/2015 | Chen et al. |
| 2015/0242104 | A1 | 8/2015 | Stokman et al. |
| 2018/0336122 | A1* | 11/2018 | Kogan ................ G06F 11/3672 |

OTHER PUBLICATIONS

International Searching Authority; International Search Report and Written Opinion dated Aug. 26, 2016 for PCT Application No. PCT/US2015/062914, filed Nov. 30, 2015; 10 pages.

Loizou, Christos P.; "How do you identify key frames in a video sequence?" ResearchGate; May 15, 2014; 5 pages; downloaded from http://www.researchgate.net/post/How_do_you_identify_key_frames_in_a_video_sequence on Nov. 23, 2015.

Simonite, Tom; "MIT Technology Review; "Algorithmic Video Editor Turns Amateur Athletes into GoPro Heroes"; Aug. 21, 2015; available at https://www.technologyreview.com/s/540816/algorithmic-video-editor-turns-amateur-athletes-into-GoPro-Heroes"; 4 pages.

Wikipedia; "Shot transition detection," downloaded Oct. 1, 2019, 5 pages.

Facit, "Eye Tracking—A Helpful Addition in User Experience Tests," (Research Paper), Feb. 3, 2012, available at http://www.facit-digital.com/en/evaluation/eye-tracking/.

User Tests, "Eye Tracking," (Web Page), available at http://www.user-tests.eu/eye-tracking/.

* cited by examiner

DETERMINING VISUAL TESTING COVERAGES

BACKGROUND

Application testing may be performed to provide information about an application under test ("AUT"). For example, application testing may be performed to determine whether the AUT includes any errors or other defects. In some circumstances, application testing may be performed manually, where the results of the manual test may be based on the visual perception and visual analysis of a human tester.

BRIEF DESCRIPTION OF THE DRAWINGS

The following detailed description references the drawings, wherein.

DETAILED DESCRIPTION

Figure 1:
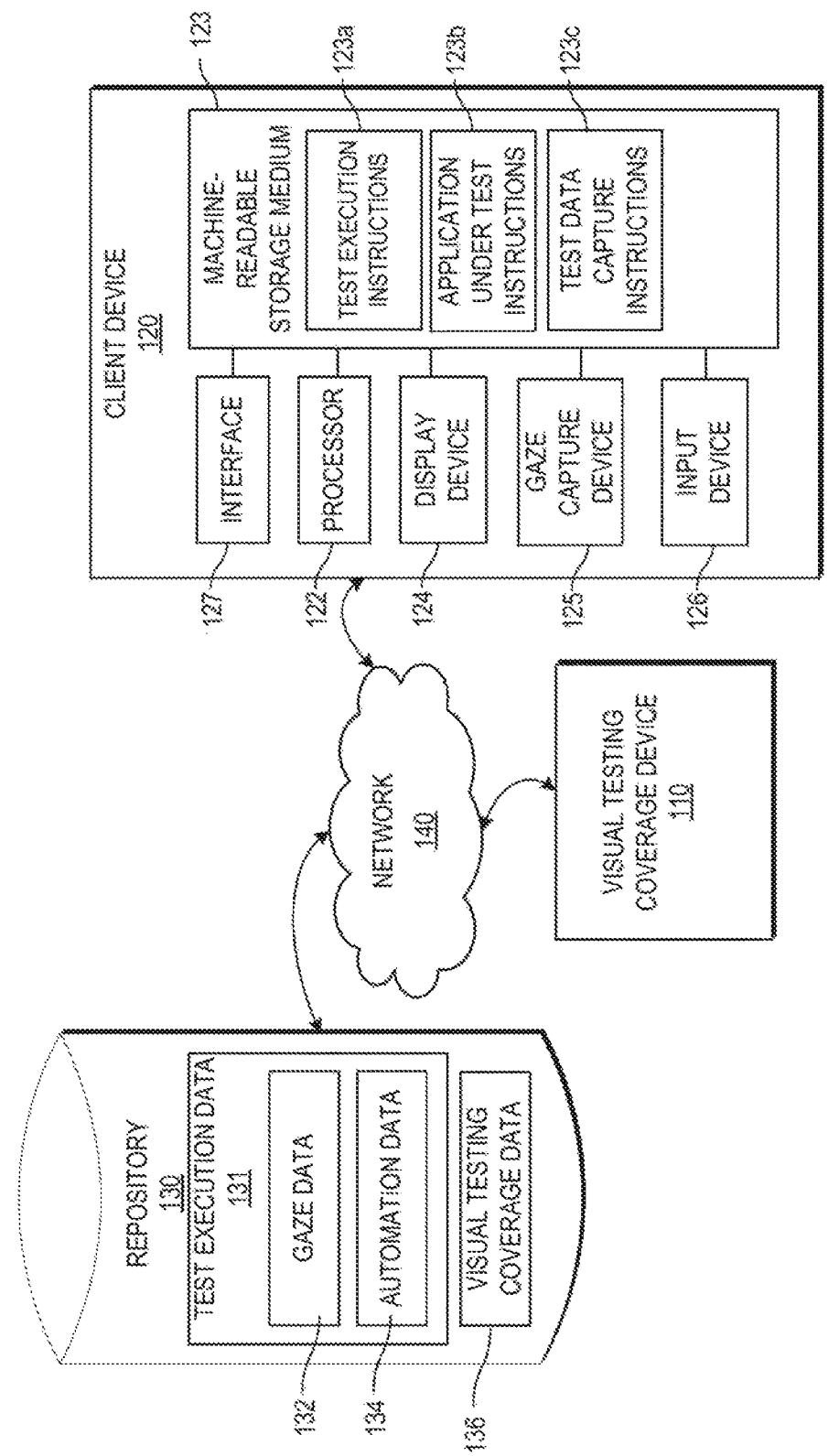
FIG. 1 is a block diagram of an example system for determining visual testing coverages consistent with disclosed implementations.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As discussed above, manual testing may be performed to test an AUT, where the results of the manual test may be based on the visual perception and visual analysis of a human tester. For example, manual testing may be used to measure how user-friendly, efficient, or convenient an application is for end-users. In some circumstances, the degree to which the AUT is tested during manual testing may be estimated based on tracking input device-based user actions (e.g., keyboard inputs and mouse moves). However, simply tracking input device-based user actions does not provide an accurate picture of all manual tests since a large portion of manual testing may involve visual verifications that may not require the use of an input device. For example, using human vision and/or perception, a manual tester can detect problems with an AUT's look and feel, the responsiveness of the site, separate relevant and non-relevant information on the screen (such as promotion banners), and the like. Accordingly, a proper estimation of test coverage should include visual testing coverage, and should account for areas on the AUT that the manual tester viewed, even if no input device-based user action was performed.

Some examples disclosed herein may help determine visual testing coverage. In some implementations, the visual testing coverage may be determined based on data related to the gaze activity of a manual tester ("gaze data") that has been collected with eye tracking technology. For example, some implementations consistent with disclosed examples may identify, based on an image processing analysis of a set of screenshots of an AUT, principal application screens that represent a set of test executions of the AUT, identify user interface ("UI") elements in the principal applications screens, and automatically identify, based on an analysis of gaze data and the UI elements, a visual testing coverage of the AUT. As used herein, a screenshot may be considered to be any image that captures visual output. For example, a screenshot may be a digital image created using an application running on a client device (e.g., client device 120), a digital image captured by a camera (e.g., a still camera and/or video camera), a digital image created by a device intercepting the video output of a display, and the like.

Referring now to the drawings, FIG. 1 is a block diagram of an example system 100 for determining visual testing coverages consistent with disclosed implementations. System 100 may be implemented in a number of different configurations without departing from the scope of the disclosed examples. In the example shown in FIG. 1, system 100 may include a visual testing coverage device 110, a client device 120, a repository 130, and a network 140 for connecting visual testing coverage device 110 with client device 120 and/or repository 130.

Visual testing coverage device 110 may be a computing system that performs various functions consistent with disclosed examples. For example, visual testing coverage device 110 may be a server, a desktop computer, a laptop computer, and/or any other suitable type of computing device. In some examples, visual testing coverage device 110 may process information received from client device 120 and/or repository 130. For example, visual testing coverage device 110 may determine a visual testing coverage based on gaze data captured from client device 120 and/or received from repository 130. Examples of visual testing coverage device 110 and certain functions that may be performed by device 110 are described in greater detail below with respect to, for example, FIGS. 2-4, 8, and 9.

Client device 120 may be a computing system operated by a user. For example, client devise 120 may be a desktop computer, a laptop computer, a tablet computing device, a mobile phone, and/or any other suitable type of computing device. in some examples, client device 120 may be a computing device to perform operations consistent with certain disclosed implementations. For example, client device 120 may be adapted to transmit data (e.g., gaze data, input data, and/or the like) related to test executions of an AUT to visual testing coverage device 110.

Client device 120 may include a processor to execute instructions stored in a machine-readable storage medium. In the example shown in FIG. 1, client device 120 may include a processor 122, a machine-readable storage medium 123, a display device 124, a gaze capture device 125, an input device 126, and an interface 127. Processor 122 of client device 120 may be at least one processing unit (CPU), microprocessor, and/or another hardware device to execute instructions to perform operations. For example, processor 122 may fetch, decode, and execute instructions stored in machine-readable storage medium 123 to test an AUT, such as test execution instructions 123a (e.g., instructions related to executing the test), AUT instructions 123b (e.g., instructions related to executing the AUT), and/or test data capture instructions 123c (e.g., instructions related to capturing data during the test executions). While in the example shown in FIG. 1 instructions 123a, 123b, and 123c reside on client device 120, instructions 123a, 123b, and/or 123c may reside on different machines and/or may span multiple computing systems. For example, AUT instructions 123b may reside on a computing device that serves as the backend of the AUT, and that is separate and distinct from client device 120. Machine-readable storage medium 123 may be any electronic, magnetic, optical, or other non-transitory storage device that stores instructions executed by processor 122.

Display device 124 may be any type of display device that presents information (e.g., a UI of an AUT, a test verification interface, etc.) to a user (e.g., a tester) operating client device 120.

Gaze capture device 125 may be any combination of hardware and/or programming that captures gaze data. In some implementations, gaze capture device 125 may be a device that captures gaze data that represents where a tester looks on an application screen of an AUT (e.g, a gaze point) and/or how they move their gaze. For example, gaze capture device 125 may be a hardware eye tracker device, a camera (e.g., mounted on a desktop, glasses, mobile device, etc.), and/or any other suitable device capable of collecting gaze data. In some implementations, gaze capture device 125 may be an eye tracker device that comprises near-infrared micro projectors, optical sensors, and an image processing device. The micro projectors may create reflection patterns on human eyes looking at a screen, and the optical sensors may register the image of the user, the user's eyes, and the projection patterns in real-time. The image processing device may be used to find features of the user, the eyes, and the projection pattern, and models may be applied to calculate gaze capture data, such as the eyes' position and gaze point (e.g., [x,y] coordinates) on a display of an application screen of the AUT, the length of time spent at the gaze point, the order in which the gaze point was viewed relative to other gaze points, and/or the like. The gaze data may be transmitted to a repository, such as repository 130, and stored as gaze data 132. While in the example shown in FIG. 1 gaze capture device 125 is part of client device 120, gaze capture device 125 may be separate and distinct from client device 120.

Input device 126 may be any device used to provide input to client device 120, such as a keyboard, a mouse, a touchpad, a gesture control device, a voice recognition device, and the like.

Interlace 127 may be any combination of hardware and/or programming that facilitates the exchange of data between the internal components of client device 120 and external components, such as visual testing coverage device 110. In some examples, interface 127 may include a network interface device that allows client device 120 to receive and send data to and from various components, such as from client device 120 to repository 130 via network 140.

Repository 130 may be any type of storage system configuration that facilitates the storage of data. In some implementations, repository 130 may facilitate the locating, accessing, and retrieving of data points captured during test executions of an AUT (e.g., SaaS, SQL, Access, etc. databases). For example, repository 130 may store test execution data 131, which may include gaze data (e.g., data related to where testers looked and moved their gaze, which may include a collection of coordinates (e.g., [x,y]) of a tester's gaze on a particular application screen) and automation data (e.g., data related to where an automated test performed user actions, such as keystrokes or mouse clicks). Repository 130 may also store visual testing coverage data 136, which may relate to the visual testing coverage of a single test of the visual testing coverage of aggregated tests.

Repository 130 can be populated by a number of methods. For example, visual testing coverage device 110 may populate repository 130 with test execution data captured by gaze capture device 125 of client device 120, and store the test execution data as test execution data 131 in repository 130. While in the example shown in FIG. 1 the test execution data 131 and visual testing coverage data 136 reside in repository 130, any portion of the test execution data 131 and/or visual testing coverage data 136 may reside on different storage systems. Furthermore, while in the example shown in FIG. 1 repository 130 is a single component external to components 110 and 120, repository 130 may comprise separate components and/or may be part of devices 110, 120, and/or another device. In some implementations, repository 130 may be managed by components of device 110 and/or other devices that are capable of accessing, creating, controlling and/or otherwise managing data remotely through network 140.

Network 140 may be any type of network that facilitates communication between remote components, such as visual testing coverage device 110 and client device 120. For example, network 140 may be a local area network (LAN), a wide area network (WAN), a virtual private network, a dedicated intranet, the Internet, and/or a wireless network.

The arrangement illustrated m FIG. 1 is simply an example, and system 100 may be implemented in a number of different configurations. For example, while FIG. 1 shows one visual testing coverage device 110, client device 120, repository 130, and network 140, system 100 may include any number of components 110, 120, 130, and 140, as well as other components not depicted in FIG. 1. For example, system 100 may omit any of components 110, 120, 130, and 140, and/or the functionality of at least one of components 110, 120, 130, and 140 may be incorporated into another component (e.g., components 110, 120, 130, 140, and/or a component not shown in FIG. 1). As another example, system 100 may include multiple client devices 120, such as two client devices. A first client device (e.g., a functional testing as a service device ("FTaaS device")) may cause the display of the AUT and may cause the display to be mirrored to a second client device (e.g., a client device accessed by a tester and that runs a gaze capture device). In this way, a tester may perform actions on the AUT as if it was running on the tester's client device.

Figure 2:
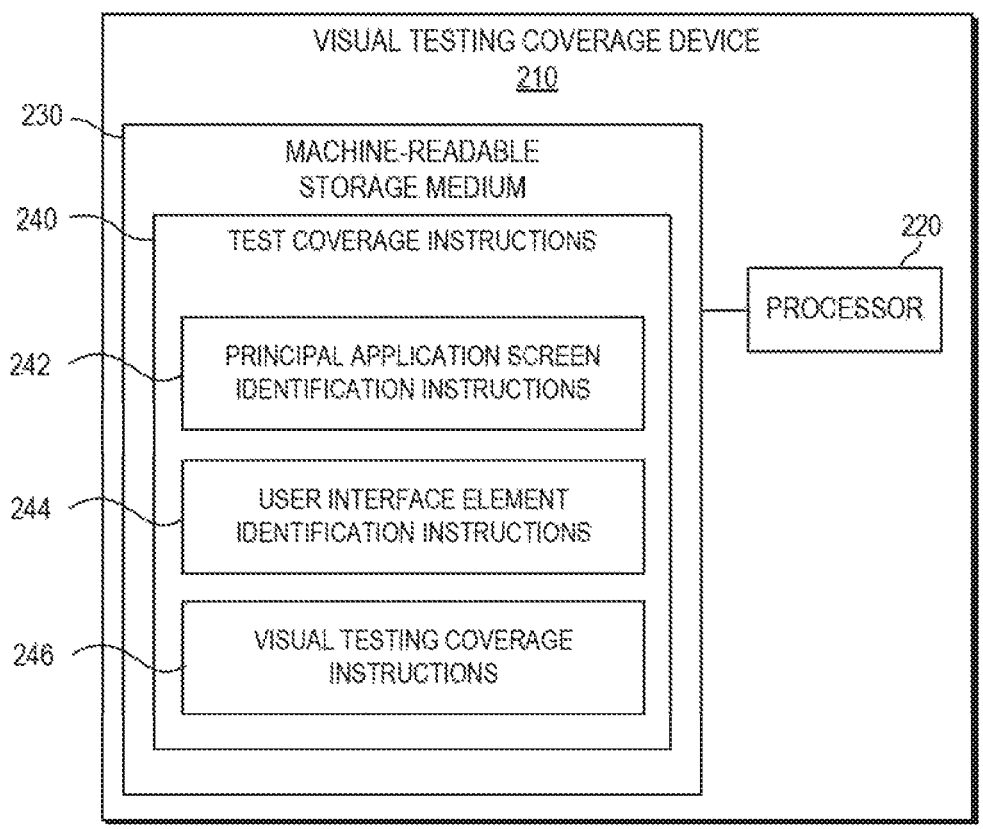
FIG. 2 is a block diagram of an example visual testing coverage device consistent with disclosed implementations.

FIG. 2 is a block diagram of an example visual testing coverage device 210 consistent with disclosed implementations. In certain aspects, visual testing coverage device 210 may correspond to visual testing coverage device 110 of FIG. 1. Visual testing coverage device 210 may be implemented in various ways. For example, visual testing coverage device 210 may be a special purpose computer, a server, a mainframe computer, and/or any other suitable type of computing device. In the example shown in FIG. 2, visual testing coverage device 210 may include a processor 220 and a machine-readable storage medium 230.

Processor 220 may be at least one processing unit (CPU), microprocessor, and/or another hardware device to execute instructions to perform operations. For example, processor 220 may fetch, decode, and execute test coverage instructions 240 (e.g., instructions 242, 244, and/or 246 stored in machine-readable storage medium 230 to perform operations consistent with disclosed examples.

Machine-readable storage medium 230 may be any electronic, magnetic, optical, and/or other physical storage device that stores executable instructions. Thus, machine-readable storage medium 230 may be, for example, memory, a storage drive, an optical disc, and the like. In some implementations, machine-readable storage medium 230 may be a non-transitory machine-readable storage medium, where the term "non-transitory" does not encompass transitory propagating signals. Machine-readable storage medium 230 may be encoded with instructions that, when executed by processor 220, perform operations consistent with disclosed implementations. For example, machine-readable storage medium 230 may include instructions that perform operations to determine the visual testing coverage of an AUT by identifying principal application screens that represent a set of test executions of the AUT, identifying UI elements in the principal application screens, and automatically identifying, based on an analysis of gaze data and the UI elements, the visual testing coverage of the AUT. In the example shown in FIG. 2, machine-readable storage medium 230 may Include principal application screen identification instructions 242, user interface ("UI") element identification instructions 244, and visual testing coverage instructions 246.

Principal application screen identification instructions 242 may function to identify principal application screens that represent a set of test executions of the AUT. In some implementations, when principal application screen identification instructions 242 are executed by processor 220, principal application screen identification instructions 242 may cause processor 220 and/or another processor to identify, based on an image processing analysis (e.g., image processing performed by a computing device, such as digital image processing) of a set of screenshots of an AUT, principal application screens that represent a set of test executions of the AUT. For example, principal application screen identification instructions 242 may cause processor 220 and/or another processor to identify principal application screens by comparing each of the screenshots in the set of screenshots to each ether to identify a subset of screenshots. In some implementations, the subset of screenshots may be identified based on actions occurring during the set of test executions. Examples of identifying principal application screens are described in further detail below with respect to, for example, FIGS. 4-7.

UI element identification instructions 244 may function to identify UI elements in the principal application screens. For example, when UI element identification instructions 244 are executed by processor 220, UI element identification instructions 244 may cause processor 220 to divide the principal application screens into a plurality of UI element areas using various techniques. For example, division of the principal application screens into a plurality of UI element areas can be performed by analyzing the DOM or HTML of a web page, using image processing, and/or the like. The UI element areas may include a single UI element or grouped UI elements. In some implementations, the UI elements are identified using a combination of image recognition techniques and optical character recognition ("OCR"). For example, identified principal application screens may be analyzed to find text and adjacent text may be grouped together when an element contains more than one word. The adjacent text may be found using distance thresholds well as additional techniques such as slightly increasing the font size and blurring the text pixels. Additionally, menu elements may be identified at the left, right, or upper parts of the principal application screen by identifying elements that are aligned vertically or horizontally and appear on multiple screens at approximately the same area. In some implementations, elements that are aligned vertically and/or horizontally and appear in many application screens can be grouped together. For example, multiple UI elements may be joined together to create a particular UI element area. In some implementations, buttons and UI controls may be identified by finding rectangles. In some implementations, the principal application screens may be converted to black and white images to increase the contrast and thereby increase the accuracy and edge detection that are applied to the screens.

Visual testing coverage instructions 246 may function to automatically identify, based on an analysis of gaze data and the UI elements, a visual testing coverage of the AUT. In some implementations, the visual testing coverage of the AUT may include the visual testing coverage of principal application screens identified based on test executions of the AUT. For example, when visual testing coverage instructions 246 are executed oy processor 220, visual testing coverage instructions 246 may cause processor 220 to map gaze points in the gaze data to UI element areas on the principal application screens (e.g., based on gaze point coordinates and UI element area coordinates on the principal application screens, such as those described below with respect to, for example, FIG. 8), determine whether each of the UI element areas includes a particular number of gaze points or a particular time of fixation, identify a UI element area of the areas as covered if the UI element area includes the particular number of gaze points or the particular time of fixation, and/or identify the UI element area as not covered if the UI element area does not include the particular number of gaze points and does not include the particular time of fixation. As another example, when visual testing coverage instructions 246 are executed by processor 220, visual testing coverage instructions may cause processor 220 to generate a visual testing coverage report of the visual testing coverage. The visual testing coverage report may include a visualization of the gaze data applied to the principal application screens and an indication of whether the UI element areas in the principal application screens are covered or not covered. Examples of automatically identifying a visual testing coverage are described in further detail below with respect to, for example, FIGS. 2-11.

Figure 3:
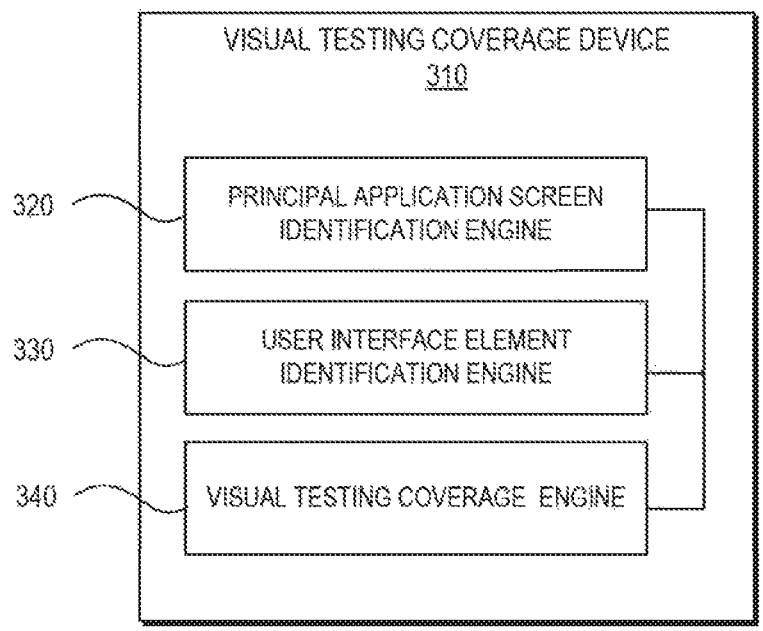
FIG. 3 is a block diagram of an example visual testing coverage device consistent with disclosed implementations.

FIG. 3 is a block diagram of an example visual testing coverage device 310 consistent with disclosed implementations. In certain aspects, visual testing coverage device 310 may correspond to visual testing coverage device 110 of FIG. 1 and/or visual testing coverage device 210 of FIG. 2. Device 310 may be implemented in various ways. For example, device 310 may be a special purpose computer, a server, a mainframe computer, and/or any other suitable type of computing system. In the example shown in FIG. 3; device 310 may include a principal application screen identification engine 320, a user interface ("UI") element identification engine 330, and a visual testing coverage engine 340.

Engines 320, 330, and 340 may be electronic circuitry for implementing functionality consistent with disclosed examples. For example, engines 320, 330, and 340 may represent combinations of hardware devices and programming to implement functionality consistent with disclosed implementations. In some examples, the functionality of engines 320, 330, and/or 340 may correspond to operations performed by visual testing coverage device 210 of FIG. 2, such as operations performed when test coverage instructions 240 are executed by processor 220 (described above with respect to FIG. 2). In FIG. 3, principal application screen identification engine 320 may represent a combination of hardware and programming that performs operations similar to those performed when processor 220 executes principal application screen identification instructions 242. For example, principal application screen identification engine 320 may identify principal application screens by causing the periodic capture of images from display devices that are displaying a test execution in a set of test executions. The images may be, for example, the set of screenshots or may be video of the test execution, from which the set of screenshots may be extracted.

Similarly, UI element identification engine 330 may represent a combination of hardware and programming that performs operations similar to those performed when processor 220 executes UI element identification instructions 244. For example, UI element identification engine 330 may identify UI elements in principal application screens based on an analysis of each of the screenshots in the set of screenshots, such as the analysis described above with respect to UI element identification instructions 244. Visual testing coverage engine 340 may also represent a combination of hardware and programming that performs operations similar to those performed when processor 220 executes visual testing coverage instructions 246. For example, in some implementations, visual testing coverage engine 340 may cause the capture of gaze data and/or input data during the test executions, such as the capture of gaze data and/or input data during manual test executions and the capture of input data during automated test executions. As another example, visual testing coverage engine 340 may identify, based on an analysis of the input data and the gaze data, a total testing coverage of the principal application screens. For example, visual testing coverage engine 340 may combine the visual testing coverage report described below with input device based testing coverage results (e.g., traditional testing coverage results) to identify a total testing coverage.

Figure 4:
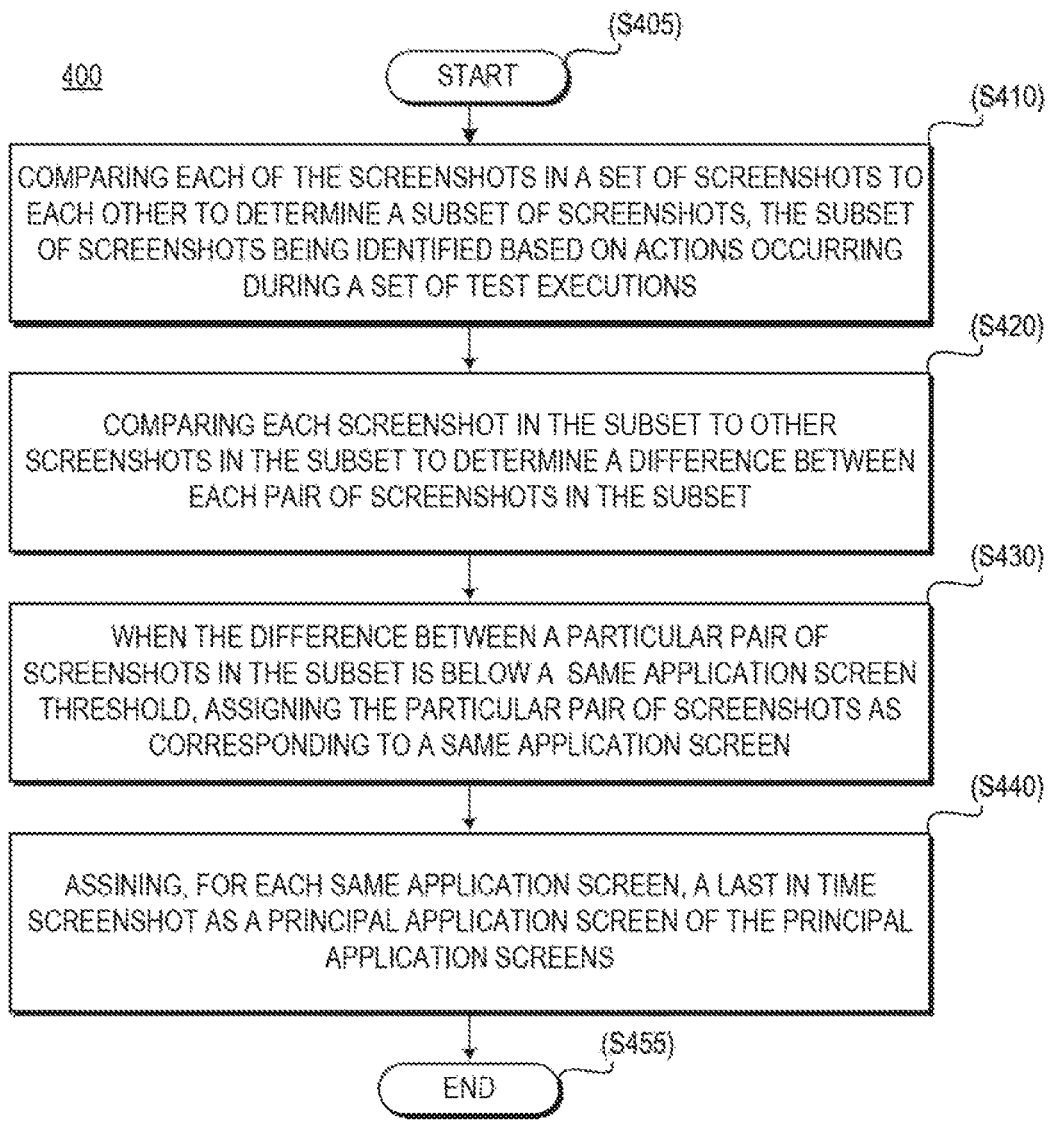
FIG. 4 is a flow chart of an example process for identifying principal application screens consistent with disclosed implementations.

FIG. 4 is a flow chart of an example process 400 for identifying principal application screens consistent with disclosed implementations. Although execution of process 400 is described below with reference to system 100 of FIG. 1 and/or specific components of system 100, other suitable systems and devices for execution of at least one step of process 400 may be used. For example, processes described below as being performed by visual testing coverage device 110 may be performed by visual testing coverage device 210, visual testing coverage device 310, and/or any other suitable device. Process 400 may be implemented in the form of executable instructions stored on a machine-readable storage medium and/or in the form of electronic circuitry.

Process 400 may start (step S405) after a set of screenshots of test executions of the AUT have been captured. For example, during manual testing of the AUT, system 100 (e.g., visual testing coverage device 110) may cause the capture of screenshots from screens displaying the manual tests, such as, for example, display device 124 of client device 120. As another example, the capture of screenshots may be performed by a component external to system 100. In some implementations, the set of screenshots may be captured at particular point(s) in time. For example, the screenshots may be captured during every 50 ms of each test execution, thereby creating a sequence of consecutive screenshots.

Process 400 may include comparing each of the screenshots in the set of screenshots to each other to determine a subset of screenshots, the subset of screenshots being identified based on actions occurring during a set of test executions (step S410). For example, during a test execution of the AUT, there may be actions that occur that are reflected in the visual output of the AUT, such as a tester entering an input, the application responding, the application producing output, and the like. Between these events, there may be times where no action is occurring. For example, the application may be waiting for user input or may be processing data without any output or change being made to the visual display. The subset of screenshots may be identified so as to correspond to the points in time at which actions are occurring as reflected on the display device showing the visual output of the AUT, while screenshots from the times between these moments of action will not be identified for the subset. Screenshots that are part of the subset (e.g., screenshots that document actions occurring during the test execution) may be considered to be principal application screens.

In some implementations, the principal application screens may be identified by visual testing coverage device 110. For example, visual testing coverage device 110 may compare each of the screenshots to each other to identify the subset of screen shots. In some implementations, the comparison may include determining a degree of change between consecutive pairs of screenshots in the set of screenshots. For example, visual testing coverage device 110 may compare each screenshot to a previous screenshot in the set of screenshots using image comparison techniques to identify differences between the screens (e.g., a change in the AUT display). When the degree of change of a consecutive pair of the consecutive pairs exceeds a subset threshold (e.g., the difference is greater than a predetermined amount), visual testing coverage device 110 may assign a last in time screenshot of the consecutive pair to the subset of screenshots. For example, If the screenshots that are being compared include two images related to two different AUT screens, the degree of change may exceed the threshold. As another example, if the screenshots that are being compared include two images related to the same AUT screen but one may include data entered into a field by a manual tester while the other does not, the degree of change may also exceed the threshold. However, if the screenshots that are being compared include two images related to the same AUT screen but one may include a cursor located in a first position while the other may include a cursor located in a second position, the degree of change may not exceed the threshold.

Process 400 may also include comparing each screenshot in the subset to other screenshots in the subset to identify a difference between each pair of screenshots in the subset (step S420). For example, the screenshots may be compared using image processing techniques whereby samples of each of the screenshots are taken and compared to each other. In some implementations, the comparison of each screenshot in the subset is based on assigning greater weights to particular areas of each of the screenshots. For example, differences between the upper part and/or left part of the screenshot may be given greater weight as a number of applications include menus at these locations.

Process 400 may also include, when the difference between a particular pair of screenshots in the subset is below a same application screen threshold, assigning the particular pair of screenshots as corresponding to a same application screen (step S430). For example, during the test of an AUT, a number of different screens may be presented. On any such screen, any number of actions might occur such as, for example, two different parameters being input by a tester to a single application screen. Each of those inputs may be considered to be an action occurring during the test execution, and each may be represented by a screenshot that may be considered to be a "principal application screen," but both would correspond to the same application screen. If the application then presents a new screen, there may be a subsequent number of actions and significant frames associated with that next application screen. If the differences between the significant frames are below a same application screen threshold, this may indicate that the frames are substantially identical, indicating that both come from the same underlying application screen. In this case, the screenshots may be grouped as corresponding to a same application screen. This may continue until all the screenshots have been evaluated. Thus, in some implementations, the same application screen threshold may be a low value to account for small differences between the pairs of screenshots. Furthermore, in some implementations, visual testing coverage device 110 may select, for each screenshot assigned as corresponding to the same application screen, a last in time screenshot as representing the same application screen. For example, to reduce the size of stored visual testing coverage data, the last principal application screen for each same application screen may be stored as visual testing coverage data 136 in repository 130. In some implementations, visual testing coverage device 110 may assemble the screenshot(s) representing the same application screens to generate an application flow performed during a specific test execution.

In some implementations, visual testing coverage device 110 may assign various screenshots from different test executions (either from a single tester or multiple tester) as corresponding to a same application screen. For example, an application screen can have dynamic content (e.g., a table). Thus, if different users are performing different tests or are testing the AUT using different test flows, the content can change. In other words, the different tests may be testing the same screen, but different information is displayed. Visual testing coverage device 110 may identify that screenshots belonging to different tests may also correspond to the same application screen using techniques that are the same as or similar to those described above. Thus, in some examples, information related to multiple test executions of the AUT may be aggregated to determine the visual testing coverage. Once steps S410, S420, S430, and/or S440 are complete, process 400 may end (step S455).

Figure 5:
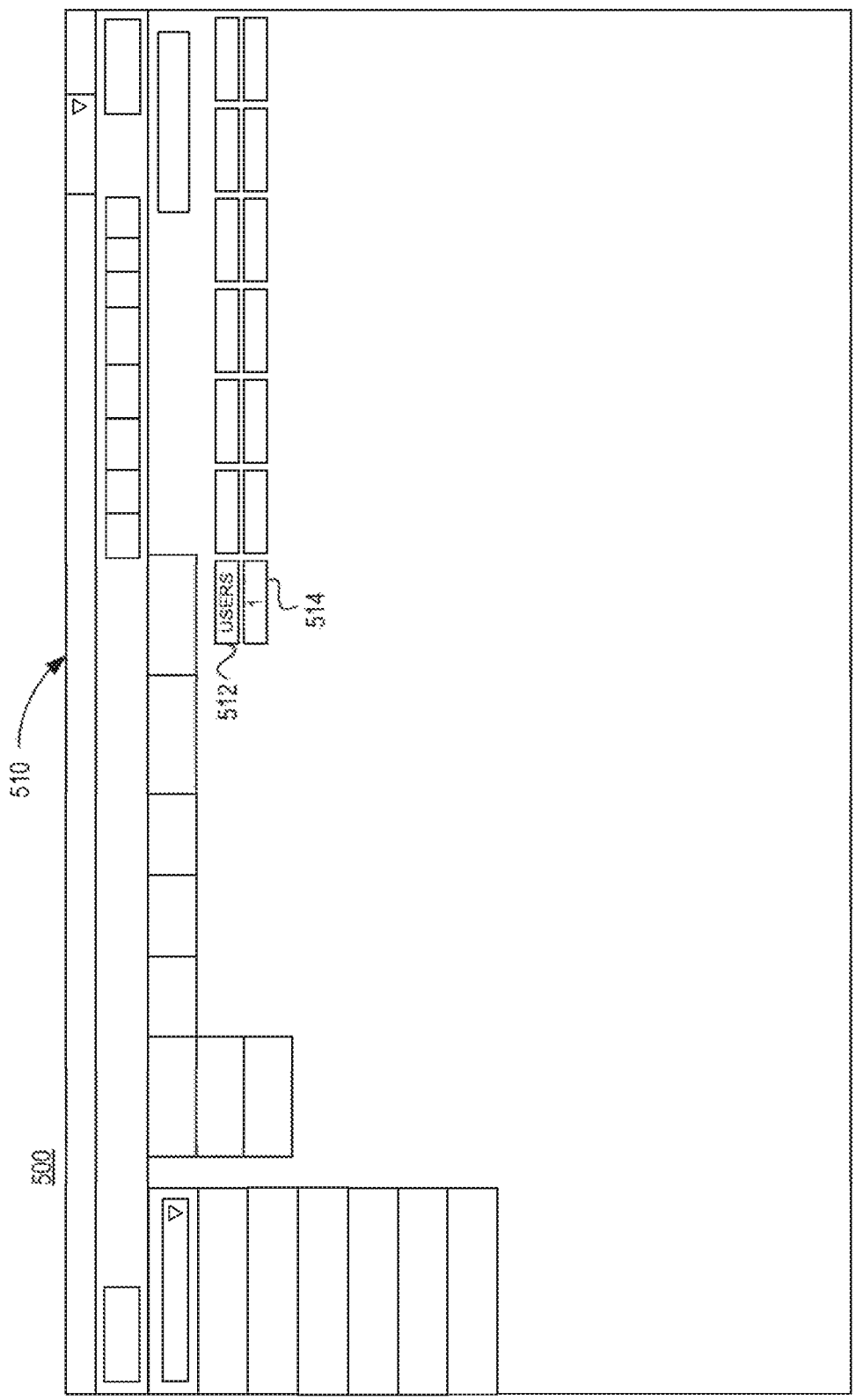
FIG. 5 is a simplified illustration of a first example screenshot of an application under test consistent with disclosed implementations.
Figure 6:
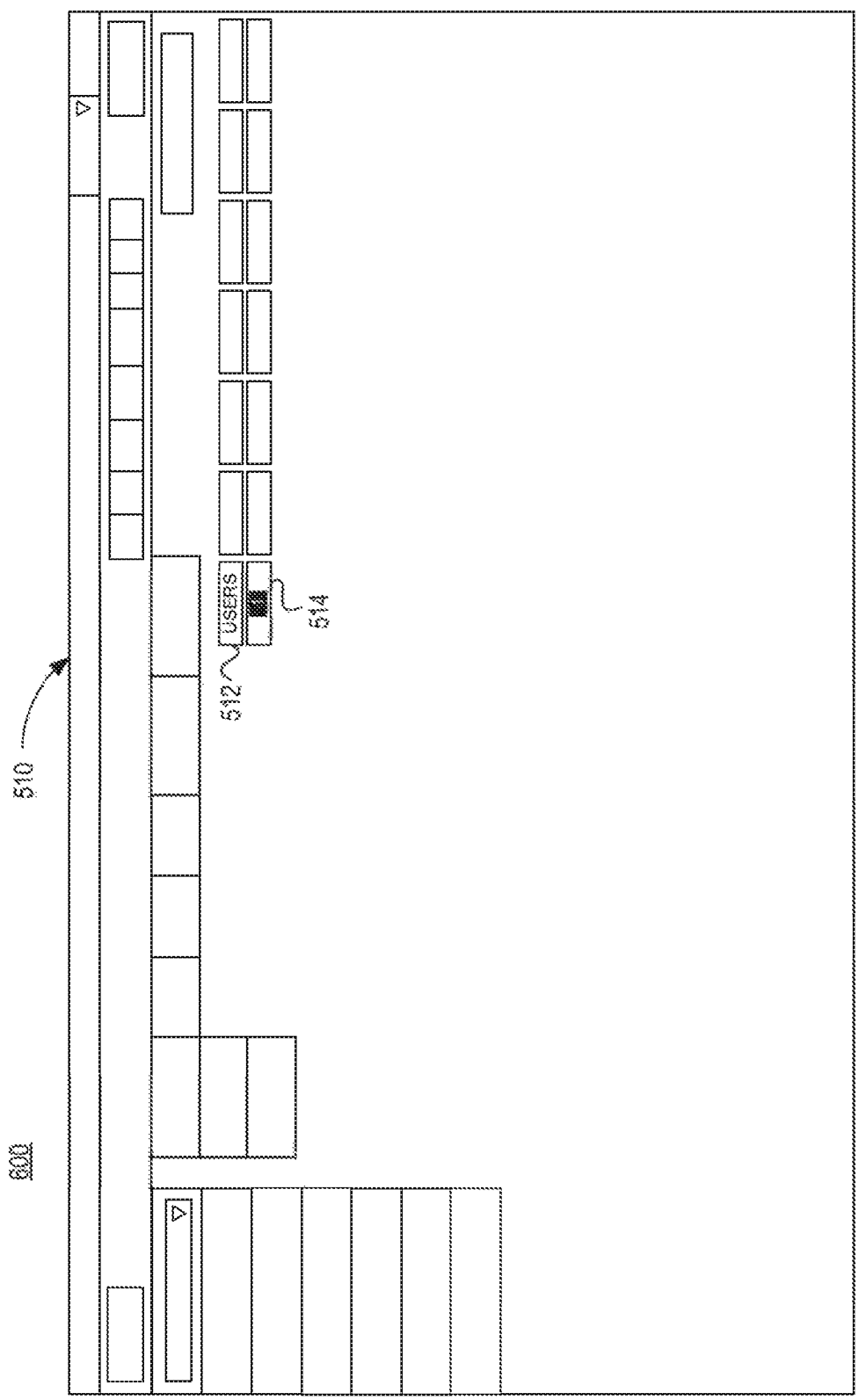
FIG. 6 is a simplified illustration of a second example screenshot of an application under test consistent with disclosed implementations.
Figure 7:
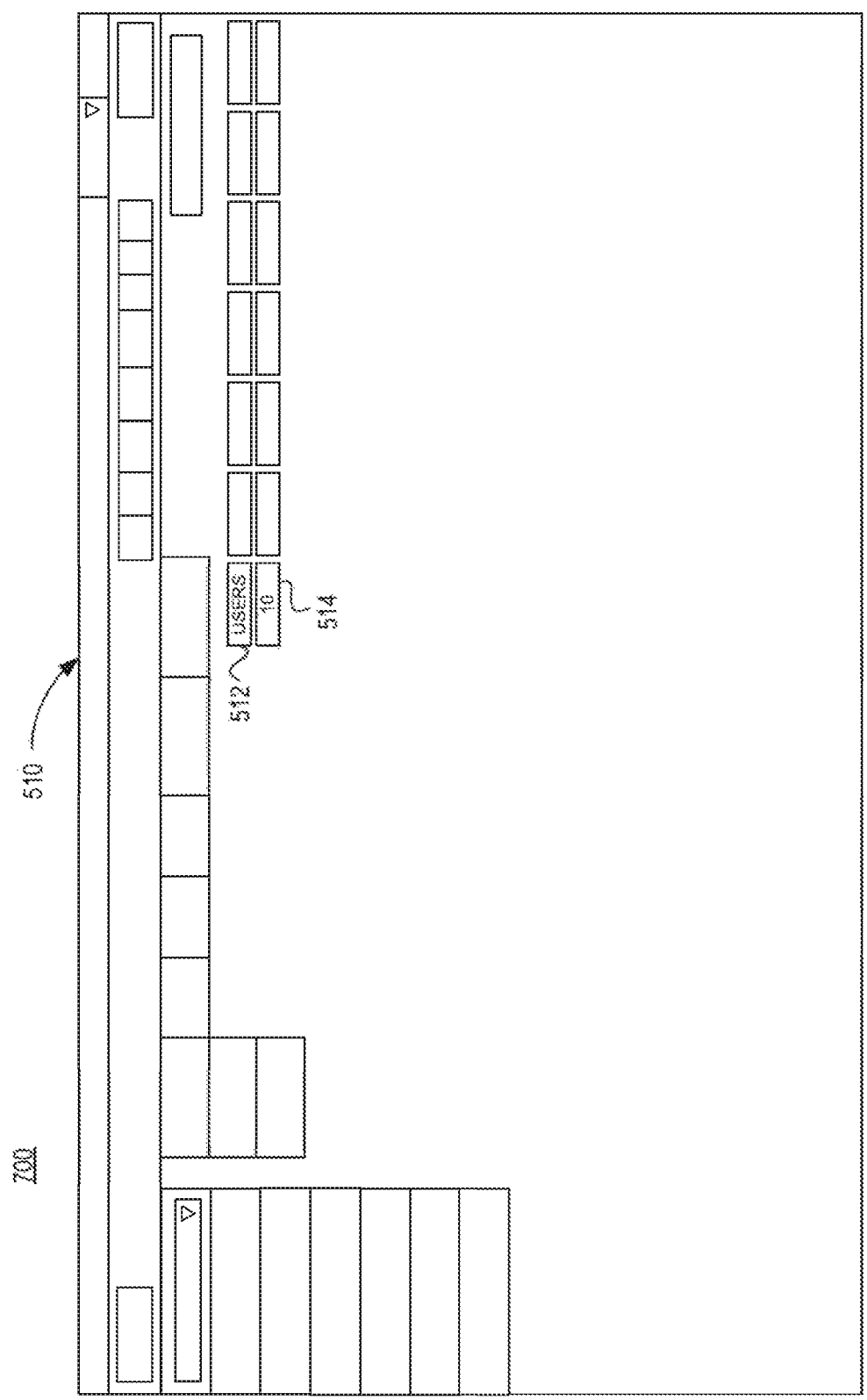
FIG. 7 is a simplified illustration of a third example screenshot of an application under test consistent with disclosed implementations.

FIGS. 5-7 are simplified illustrations of an example set of screenshots of a same application screen of an AUT consistent with disclosed implementations, though each of the set of screenshots show the same application screen in different states. Accordingly, each of the set of screenshots may be identified (e.g., by visual testing coverage device 110) as corresponding to a same application screen and/or grouped together within the subset of application screens. The example screenshots shown in FIGS. 5-7 are consecutive screenshots, meaning that the screenshot in FIG. 5 was taken immediately prior to the screenshot in FIG. 6, and the screenshot in FIG. 6 was taken immediately prior to the screenshot in FIG. 7.

FIG. 5 is a simplified illustration of a first example screenshot 500 of an AUT consistent with disclosed implementations. In the example shown in FIG. 5, an application screen 510 may include a plurality of fields (only one of which, field 512 related to "USERS," is labelled for clarity). Field 512 includes a corresponding input, box 514 in which a quantify of "USERS" can be specified. In the illustrated screenshot 500, that quantity is given as "1."

FIG. 6 is a simplified illustration of a second example screenshot 600 of an AUT consistent with disclosed implementations. In the example shown in FIG. 6, a change has occurred to input box 514 of screen 510, but the screen is still considered a same application screen. In this particular example, a tester has invoked a cursor in input box 514 so that the quantity specified can be changed. This user action is reflected in the visual output of the application by the cursor in input box 514. Specifically, the cursor is shown as a highlight on the number of the box with the background and foreground colors reversed. If the screenshot of FIG. 6 were compared, using the image processing techniques described herein, to that of FIG. 5, a change would be evident. Specifically, the change would be indicated by the change of the pixels representing the addition of the cursor. The degree of change between the two screenshots may be considered to be significant because it records an action occurring (in this case a user invoking a cursor to change the value in input box 514). Furthermore, in some implementations, the degree of change may be significant enough to exceed the subset threshold described above, and thereby at least FIG. 6 may be identified as a principal application screen.

FIG. 7 is a simplified illustration of a third example screenshot 700 of an AUT consistent with disclosed implementations. In the example shown in FIG. 7, another change has occurred to input box 514. Specifically, a tester has entered a new value of "10" in input box 514. Consequently, FIG. 7 may also be identified as a same application screen using the methods described herein. For example, the screenshot of FIG. 7 may be considered to be a principal application screen because it also records an action occurring during the test execution of the AUT (in this case, the change in from the highlighted cursor to the number "10").

Figure 8:
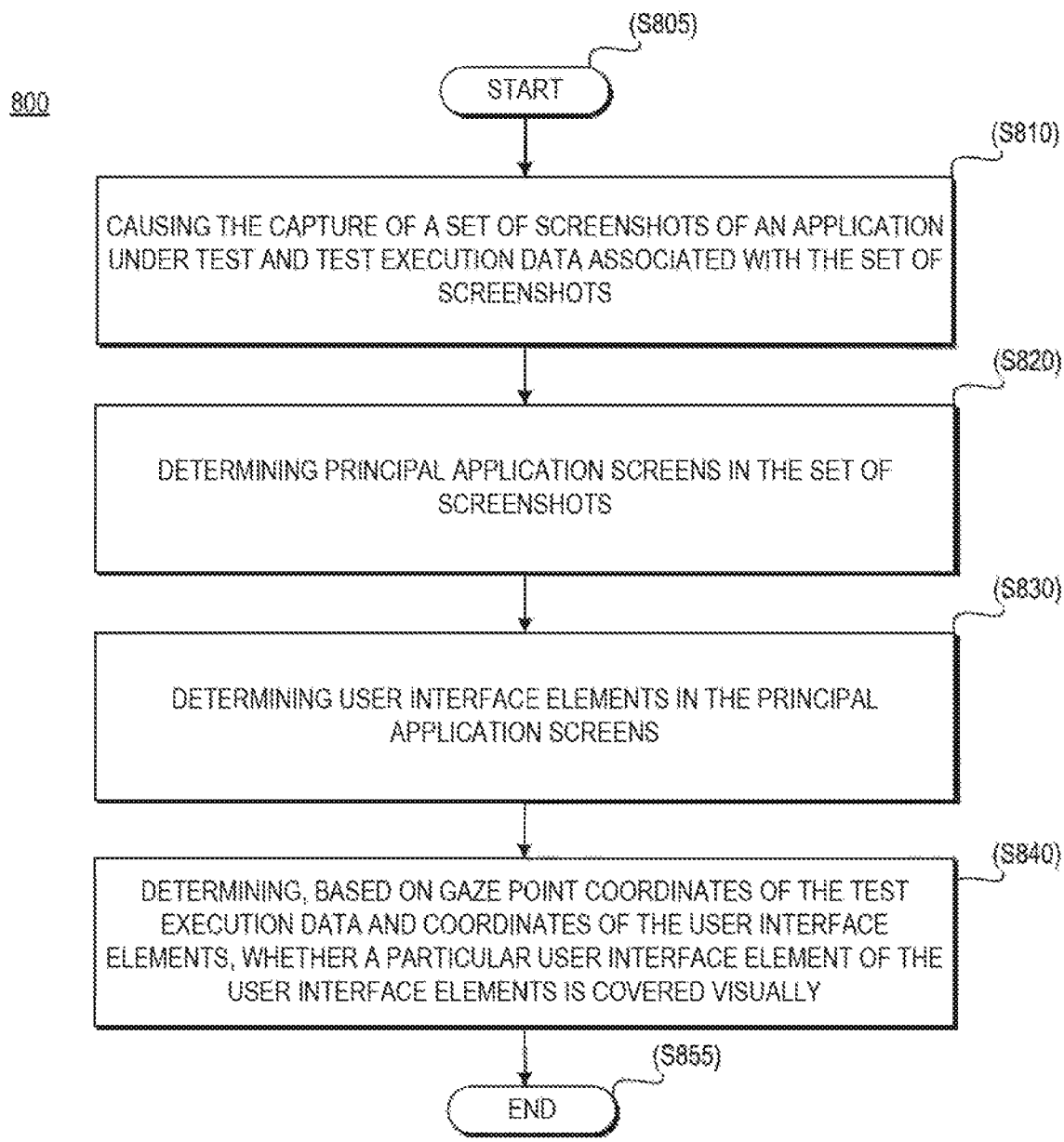
FIG. 8 is a flow chart of an example process for determining visual testing coverages consistent with disclosed implementations.

FIG. 8 is a flow chart of an example process 800 for determining visual testing coverages consistent with disclosed implementations. Although execution of process 800 is described below with reference to system 100 of FIG. 1, visual testing coverage device 310 of FIG. 3, and/or specific components of device 310 and/or system 100, other suitable systems and devices for execution of at least one step of process 800 may be used. For example, processes described below as being performed by visual testing coverage device 310 may be performed by visual testing coverage device 110, visual testing coverage device 210, and/or any other suitable device. Process 800 may be implemented in the form of executable instructions stored on a machine-readable storage medium and/or in the form of electronic circuitry.

Process 800 may begin during a test execution of an AUT. Process 800 may include causing the capture of a set of screenshots of an AUT and test execution data associated with the set of screenshots (step S810). For example, visual testing coverage device 310 (e.g., principal application screen identification engine 320) may cause client device 120 to periodically capture screenshots from a display device (e.g., display device 124) that is displaying the AUT during the test execution. As another example, visual testing coverage device 310 may cause the capture of the set of screenshots by capturing them directly. The capture of the set of screenshots may be performed periodically at predetermined time intervals, and/or for particular time periods.

Similarly, visual testing coverage device 310 may cause client device 120 and/or components external to client device 120 to capture test execution data. In some implementations, the test execution data may include gaze data, input device data, automation data, or a combination of the gaze data, the input device data, and the automation data. For example, during manual tests, visual testing coverage device 310 may cause client device 120 to capture gaze data (e.g., gaze data 132) using gaze capture device 125 and input device data using input device 126. Similarly, during automated tests visual testing coverage device 310 may cause client device 120 to capture automation data (e.g., automation data 134) from, for example, computing devices executing the automated tests. Visual testing coverage device 310 may cause the storage of the captured data, such as the gaze data, the input device data, and the automation data in a repository, such as repository 130 of system 100.

Process 800 may also include determining principal application screens in the set of screenshots (step S820). For example, visual testing coverage device 310 (e.g., using principal application screen identification engine 320) may determine the principal application screens using the methods that are the same as or similar to those described above with respect to, for example, FIGS. 1-4.

Process 800 may also include determining UI elements in the principal application screens (step S830). For example, visual testing coverage device 310 (e.g., using UI element identification engine 330) may determine the UI elements using methods that are the same as or similar to those describe above with respect to, for example, FIGS. 1-3.

Process 800 may also include determining, based on gaze point coordinates of the test execution data and coordinates of the UI elements, whether a particular UI element is covered visually (step S840). In some implementations, visual testing coverage device 310 e.g., using visual testing coverage engine 340), may determine whether a particular UI element is covered visually by mapping gaze points in the gaze data to UI element areas on the principal application screens. For example, visual testing coverage device 310 may map the gaze points in the gaze data by determining the coordinates that define the boundaries of the UI element areas, and determining whether the gaze points fall within the boundaries of the UI element areas. In some implementations, the mapped gaze points may be limited to gaze points that are fixated (e.g., a state during which the eye remained still over a period of time as opposed to quick eye movement from one fixation point to another). For example, gaze data 132 may include fixation data captured by gaze capture device 125, and visual testing coverage device 310 may parse the gaze data to identify the fixated gaze points. By mapping fixated gaze points, visual testing coverage device 310 may more accurately identify visual testing coverage. For example, if a tester wants to open a menu item in the AUT, there may be a number of gaze points around the menu because the tester's eye may need to identify there is a menu, look at the mouse to ensure the tester is making the right selection, and the like. By only mapping fixated gaze points, visual testing coverage device 310 may eliminate gaze points that do not play a significant role in the visual verification.

In some implementations, visual testing coverage device 310 (e.g., using visual testing coverage engine 340), may determine whether a particular UI element is covered visually by determining whether each of the UI element areas includes a particular number of gaze points and/or a particular time of fixation. For example, visual testing coverage device 310 may sum up the number of gaze points that have been mapped to a particular UI area, and identify whether the summed number exceeds a gaze point threshold (e.g., 3 gaze points). If the number of gaze points within the particular UI element exceeds the gaze point threshold, visual testing coverage device 310 may determine that the particular UI element includes the particular number of gaze points. As another example, visual testing coverage device 310 may determine time of fixation by summing the time(s) of fixation of the gaze point(s) that are located within a particular UI element area. The summed time of fixation may be compared to a fixation threshold and, if the summed time of fixation exceeds the fixation threshold (e.g., 1 second), visual testing coverage device 310 may determine that the particular UI element includes the particular time of fixation.

In some implementations, visual testing coverage device 310 (e.g., using visual testing coverage engine 340), may determine whether a particular UI element is covered visually by identifying a UI element area of the areas as covered if the UI element area includes a particular number of gaze points and/or includes a particular time of fixation, and identifying a UI element area of the areas as not covered if the UI element area does not include the particular number of gaze points and/or the particular time of fixation. For example, visual testing coverage device 310 may make such a determination based on information related to the particular number of gaze points alone, the particular time of fixation alone, or the particular number of gaze points in combination with the particular time of fixation. Once steps S810, S820, S830, and/or S840 are complete, process 800 may end (step S855).

Figure 9:
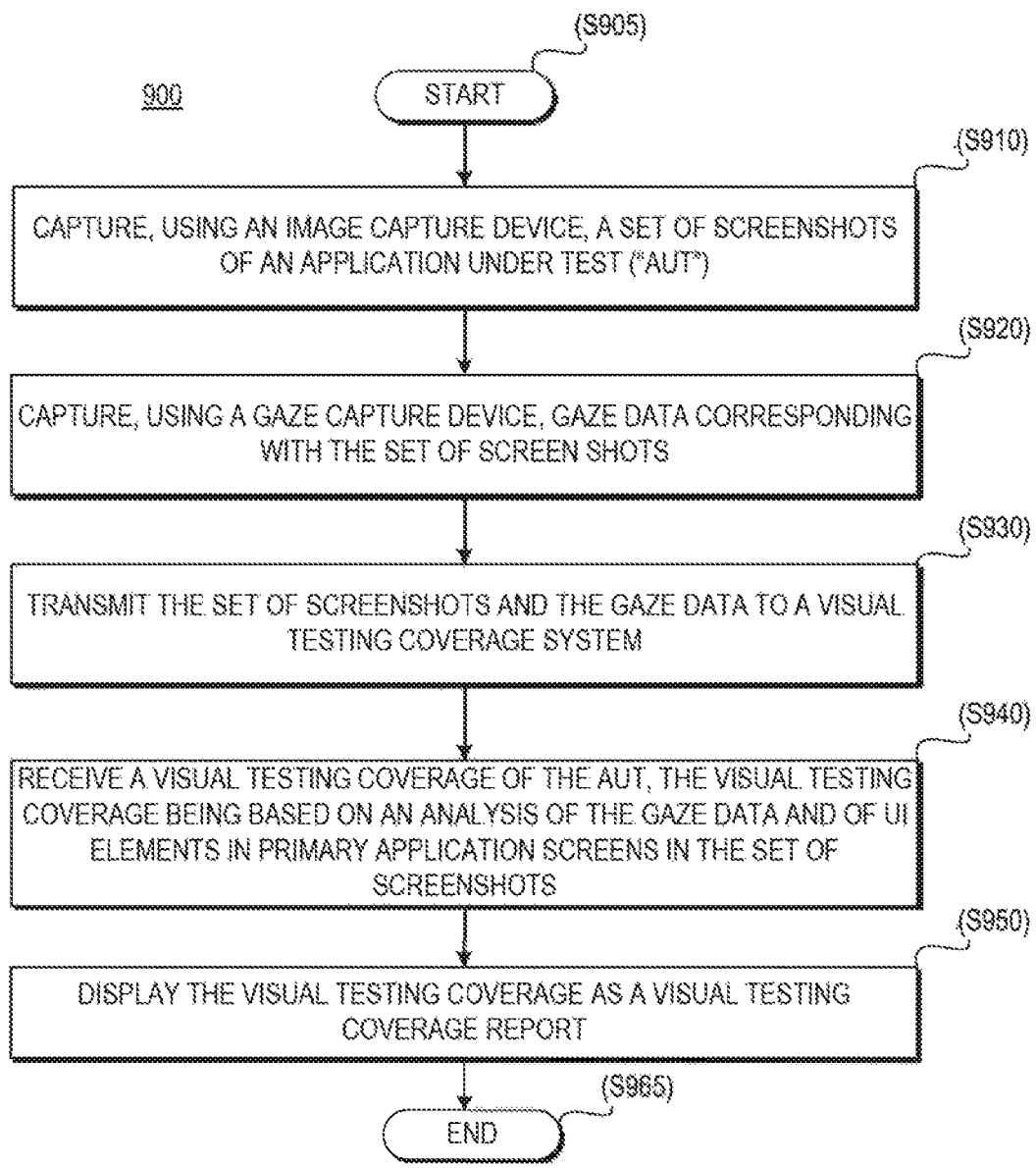
FIG. 9 is a flow chart of an example process for determining visual testing coverages consistent with disclosed implementations.

FIG. 9 is a flow chart of an example process 900 for determining visual testing coverages consistent with disclosed implementations. Although execution of process 900 is described below with reference to system 100 of FIG. 1, visual testing coverage device 310 of FIG. 3, and/or specific components of device 310 or system 100, other suitable systems and devices for execution of at least one step of process 900 may be used. For example, processes described below as being performed by visual testing coverage device 310 may be performed by visual testing coverage device 110, visual testing coverage device 210, and/or any other suitable device. Process 900 may be implemented in the form of executable instructions stored on a machine-readable storage medium and/or in the form of electronic circuitry.

Process 900 may start (step S905) during a test execution of an AUT. Process 900 may include capturing, using an image capture device, a set of screenshots of an AUT (step S910). For example, client device 120 may capture the set of screenshots during the test execution using the methods described above.

Process 900 may also include capturing, using a gaze capture device, gaze data corresponding with the set of screenshots (step S920). For example, client device 120 (e.g., using gaze capture device 125) may capture gaze data corresponding with the set of screenshots simultaneously with the set of screenshots of the AUT using the methods described above.

Process 900 may also include transmitting the set of screenshots and the gaze data to a visual testing coverage device (step S930). For example, client device 120 may transmit the set of screenshots and the gaze data using interface 127 and network 140 to visual testing coverage device 110. In some implementations, transmitting the set of screenshots may include transmitting a video recording of the test execution. The video recording may be used to extract frames of the video as screenshots. Visual testing coverage device 110 may use the transmitted data to identify the visual testing coverage of fee AUT using, for example, the methods described above.

Process 900 may also include receiving a visual testing coverage of the application under test, where the visual testing coverage is based on an analysis of the gaze data and of UI elements in principal application screens in the set of screenshots (step S940). For example, client device 120 and/or a device external to system 100 may receive the visual testing coverage of the AUT via network 140.

Figure 10:
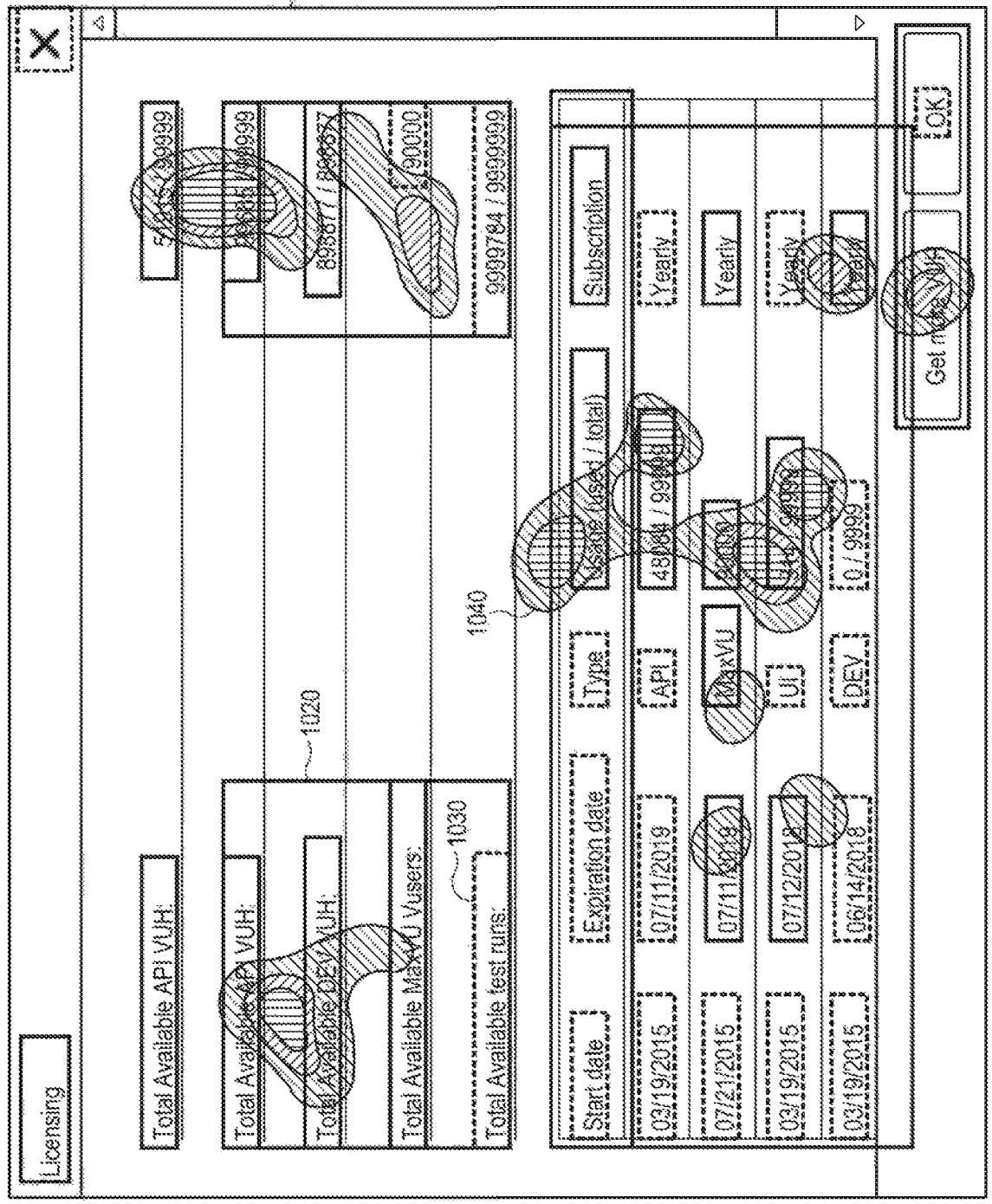
FIG. 10 is an illustration of an example visual testing coverage report consistent with disclosed implementations.
Figure 11:
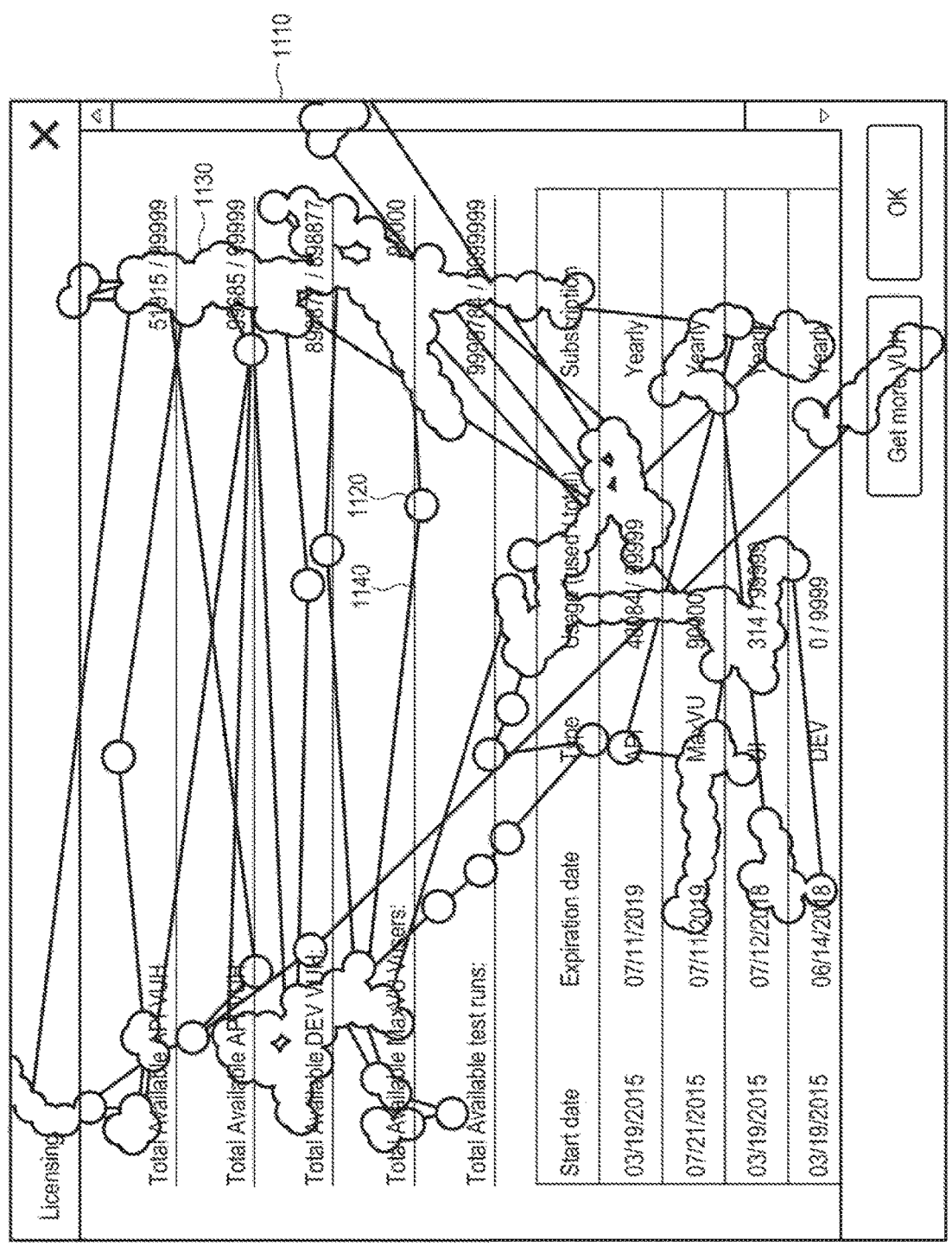
FIG. 11 is an illustration of an example visual testing coverage report consistent with disclosed implementations.

Process 900 may also include displaying the visual testing coverage as a visual testing coverage report (step S950). For example, the visual testing coverage received during step S940 may take the form of a visual testing coverage report. In some implementations, visual testing coverage device 110 may cause the generation of the visual testing coverage report, and may cause the transmission of the visual testing coverage report to client device 120 via network 140. Client device 120 may display the visual testing coverage report on display device 124. In some implementations, the visual testing coverage report may include information relating to the visual testing coverage (and/or total testing coverage) of the AUT, and may identify particular UI element areas that are considered to be covered or not covered. In some implementations, the visual testing coverage report may include a display of the principal application screens, the gaze data superimposed on the principal application screens, and an indication of whether each of the UI elements has been identified as covered or not covered. In some implementations, client device 120 may display the visual testing coverage and the visual testing coverage report Examples of visual testing coverage reports are shown in FIGS. 10 and 11. Once steps S910, S920, S930, S940, and/or S950 are complete, process 900 may end (step S965).

FIG. 10 is an illustration of an example visual testing coverage report 1000 consistent with disclosed implementations. The visual testing coverage report 1000 may display visual testing coverage(s) of a set of specific tests (e.g., a single test, tests by a particular user, tests from a number of users, tests from a particular geographic location, etc.). In some implementations, a visual testing coverage report may show a set of principal application screens, with a visualization of the visual testing coverage of each of the set of principal application screens being superimposed on an image of the corresponding principal application screen. For example, the visual testing coverage report shown in FIG. 10 may include an image of a principal application screen 1010, and a visualization of which UI element areas are covered (only one of which, UI element area 1020 has been labelled for clarity) and are not covered (only one of which, UI element area 1030 has been labelled for clarity). The visualization of which UI element areas are covered may take many forms, such as different colors and/or shapes surrounding the UI element areas. In the example illustrated in FIG. 10, the UI elements that are considered covered are shown in rectangles with solid lines, while the UI elements that are considered not covered are shown in rectangles with dashed lines. As another example, green rectangles may indicate that a particular UI element area is covered, while red rectangles that may indicate that a particular UI element area is not covered. As another example, gaze data heat maps (only one of which, heat map 1040 has been labelled for clarity) may be overlaid on the principal application screen to visualize the specific gaze data associated with that screen. However, any suitable visualization of the visual testing coverage and/or gaze data may be used.

In some implementations, the visual testing coverage report may include a visual testing coverage score that corresponds to the visual testing coverage of an AUT and/or a particular application screen. For example, the visual testing coverage score may be based on a percentage of covered elements out of all elements on the application screen, or may be based on assigning certain weights (e.g., greater weights, no weights, etc.) to particular UI element areas. In some implementations, the visual testing coverage report may also include time breakdowns of how much time has been invested in testing a particular application screen and/or its particular UI element areas, whether visual validation points that have been defined prior to testing had been covered, and/or any other suitable information.

In some implementations, a tester may jump between a test execution of an AUT and the visual testing coverage report. For example, a tester conducting a test execution on a client device (e.g., client device 120) may capture a screenshot of the current test execution of the AUT and transmit the screenshot to a visual testing coverage device (e.g, visual testing coverage device 110 using network 140). The visual testing coverage device may compare the transmitted screenshot to principal applications screens stored in a repository (e.g., repository 130) using the image comparison techniques described above to identify principal application screens that correspond to the same application screen as the transmitted screenshot. Additionally, the visual testing coverage device (e.g., visual testing coverage device 110) may transmit a visual testing coverage report related to the tester's specific screenshot to the tester's device based on the identified principal application screen. A tester may use the report related to the testers specific screenshot to test, for example, areas that have been identified as not covered.

FIG. 11 is an illustration of an example visual testing coverage report 1100 consistent with disclosed implementations. In some implementations, the visual testing coverage report shown in FIG. 11 may either be part of or separate from the visual testing coverage report shown in FIG. 10, and elements of the report shown in FIG. 11 may be used in the report shown in FIG. 10. Similarly elements of the report shown in FIG. 10 may also be used in the report shown in FIG. 11.

In the example visual testing coverage report 1100 shown in FIG. 11, an image of a principal application screen 1110 may include a superimposed gaze plot. The gaze plot may include a display of gaze points that shows not only where the tester looked, but also the order of the gaze. For example, the gaze plot may include single gaze points (e.g., gaze point 1120) and/or clustered gaze points (e.g., gaze point cluster 1130) which may be connected (e.g., by lines 1140) based on the sequence of the tester(s) gaze(s). As shown in FIG. 11, a large concentration of the testers) gazes shifted from one side of screen 1110 to the other side of screen 1110 (as shown by the lines connecting the gaze points and/or gaze point clusters). In some implementations, the visual testing coverage report may include an animation model which will allow the gaze plot to be displayed in sequence, gaze point by gaze point.

The disclosed examples may include systems, devices, machine-readable storage media, and methods for determining visual testing coverage. For purposes of explanation, certain examples are described with reference to the components illustrated in FIGS. 1-11. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by this terms. Instead, these terms are used to distinguish one element from another.

Further, the sequence of operations described in connection with FIGS. 1-11 are examples and are not intended to be limiting. Additional or fewer operations or combinations of operations may be used or may vary without departing from the scope of the disclosed examples. Furthermore, implementations consistent with tie disclosed examples need not perform the sequence of operations in any particular order, including those described with respect to FIGS. 1-11. Thus, the present disclosure merely sets forth possible examples of implementations, and many variations and modifications may be made to the described examples. All such modifications and variations are intended to be included within the scope of this disclosure and protected by the following claims.

We claim:

1. A system comprising:
   a processor; and
   a memory to store instructions that, when executed by the processor, cause the processor to:
   identify, based on an image processing analysis of a set of screenshots of an application under test, principal application screens that represent a set of test executions of the application under test;
   identify user interface elements in the principal application screens;
   map gaze points represented by gaze data to an area corresponding to a given user interface element of the user interface elements;
   determine the number of the gaze points;
   determine a time of fixation associated with the area based on the gaze data; and
   automatically identify, based on an analysis of the gaze data and the user interface elements, a visual testing coverage of the application under test, wherein automatically identifying the visual testing coverage comprises:
   comparing the number of the gaze points to a number threshold; and
   identifying the area as being covered or not covered based on a result of the comparison and the time of fixation.

2. The system of claim 1, wherein the instructions, when executed by the processor, further cause the processor to identify the principal application screens by comparing each screenshot in the set of screenshots to each other to identify a subset of screenshots, the subset of screenshots being identified based on actions occurring during the set of test executions.

3. The system of claim 2, wherein comparing each screenshot in the set of screenshots to each other to identify the subset of screenshots includes:
   determining a degree of change between consecutive pairs of screenshots in the set of screenshots; and
   assigning, when the degree of change of a consecutive pair of the consecutive pairs exceeds a subset threshold, a last in time screenshot of the consecutive pair to the subset of screenshots.

4. The system of claim 2, wherein the instructions, when executed by the processor, further cause the processor:
   compare each screenshot in the subset of screenshots to other screenshots in the subset of screenshots to identify a difference between each pair of screenshots in the subset of screenshots; and
   in response to the difference between a particular pair of screenshots in the subset of screenshots being below a same application screen threshold, assign the particular pair of screenshots as corresponding to a same application screen.

5. The system of claim 4, wherein the comparison of each screenshot in the subset of screenshots is based on assigning greater weights to particular areas of each screenshot in the subset of screenshots.

6. The system of claim 4, wherein the instructions, when executed by the processor, further cause the processor to select a screenshot of the particular pair of screenshots as representing the same application screen in response to the selected screenshot being later in time as compared to the other screenshot of the particular pair of screenshots.

7. The system of claim 1, wherein the instructions, when executed by the processor, further cause the processor to:
   identify the principal application screens by causing a periodic capture of images from display devices that are displaying a test execution in the set of test executions.

8. The system of claim 7, wherein the instructions, when executed by the processor, further cause the processor to:
   access input data captured during the test execution; and
   identify, based on an analysis of the input data and the gaze data, a total testing coverage of the principal application screens.

9. The system of claim 1, wherein the instructions, when executed by the processor, further cause the processor to identify the user interface elements based on an analysis of each screenshot in the set of screenshots.

10. The system of claim 1, wherein the instructions, when executed by the processor, further cause the processor to:
    generate a visual testing coverage report of the visual testing coverage, the visual testing coverage report including a visualization of the gaze data applied to the principal application screens and an indication of whether the user interface elements are covered or not covered.

11. A method comprising:
    determining, using a visual testing coverage device, principal application screens in a set of screenshots of an application under test;
    accessing test execution data associated with the set of screenshots;
    determining, using the visual testing coverage device, user interface elements in the principal application screens;

mapping, using the visual testing coverage device, gaze points represented by gaze data to an area corresponding to a particular user interface element of the user interface elements based on gaze point coordinates of the test execution data and coordinates of the particular user interface element;

determining, using the visual testing coverage device, the number of the gaze points;

determining, using the visual testing coverage device, a time of fixation associated with the area based on the gaze data; and determining, using the visual testing coverage device, whether the particular user interface element is covered visually, wherein determining whether the particular user interface element is covered visually comprises:
  comparing the number of the gaze points to a number threshold; and
  identifying the particular user interface element as being covered or not covered visually based on a result of the comparing of the number to the number threshold and the time of fixation.

12. The method of claim 11, wherein the test execution data includes the gaze data, input device data, automation data, or a combination of the gaze data, the input device data, and the automation data.

13. A non-transitory machine-readable storage medium including instructions which, when executed by a processor, cause the processor to:

access data representing a set of screenshots of an application under test;

access gaze data captured by a gaze capture device and corresponding with the set of screenshots;

transmit the data representing the set of screenshots and the gaze data to a visual testing coverage device;

receive a visual testing coverage of the application under test, the visual testing coverage being based on a mapping of gaze points represented by the gaze data to an area corresponding to a given user interface element of user interface elements in principal application screens in the set of screenshots, a comparison of the number of the gaze points to a number threshold, and a time of fixation associated with the area; and generate data to display the visual testing coverage as a visual testing coverage report.

14. The non-transitory machine-readable storage medium of claim 13, wherein:

the visual testing coverage report includes a display of the principal application screens, the gaze data superimposed on the principal application screens, and an indication of whether each user interface element of the user interface elements has been identified as covered or not covered.

* * * * *